United States Patent
Jang

(10) Patent No.: US 11,972,128 B2
(45) Date of Patent: Apr. 30, 2024

(54) MEMORY CONTROLLER AND METHOD OF OPERATING THE SAME

(71) Applicant: SK hynix Inc., Gyeonggi-do (KR)

(72) Inventor: In Jong Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/872,602

(22) Filed: Jul. 25, 2022

(65) Prior Publication Data

US 2022/0357850 A1   Nov. 10, 2022

Related U.S. Application Data

(63) Continuation of application No. 16/904,055, filed on Jun. 17, 2020, now Pat. No. 11,422,724.

(30) Foreign Application Priority Data

Dec. 12, 2019   (KR) .................. 10-2019-0165954

(51) Int. Cl.
*G06F 3/06*   (2006.01)
*G06F 9/30*   (2018.01)

(52) U.S. Cl.
CPC ............ *G06F 3/064* (2013.01); *G06F 3/0617* (2013.01); *G06F 3/0647* (2013.01);
(Continued)

(58) Field of Classification Search
CPC ...... G06F 3/0619; G06F 3/064; G06F 3/0647; G06F 3/0659; G06F 12/0261;
(Continued)

(56) References Cited

U.S. PATENT DOCUMENTS 10,854,290 B1 * 12/2020 Wu .................... G11C 11/5628
2017/0371575 A1   12/2017 Park et al.
(Continued)

FOREIGN PATENT DOCUMENTS

CN         106776353 A    5/2017
CN         110413535 A    11/2019

OTHER PUBLICATIONS

Notice of Allowance for the Chinese Patent Application No. 202010748711.2 issued by the Chinese Patent Office dated Jun. 27, 2023.

*Primary Examiner* — Yong J Choe
(74) *Attorney, Agent, or Firm* — IP & T GROUP LLP

(57) ABSTRACT

The present technology relates to a memory controller and a method of operating the same. The memory controller may include a block manager designating a first memory block as an open block, which is driven to program m-bit data per cell, where m is a natural number, an address manager increasing an access count value corresponding to a logical address for the first memory block whenever a program request or a read request including the logical address is received from a host, and a data manager determining a representative attribute of data programmed in the first memory block based on access count values for the logical addresses for the first memory block when a flush request is received from the host. The block manager may determine whether to designate a new open block according to the determined representative attribute.

14 Claims, 12 Drawing Sheets

(52) U.S. Cl.
CPC .......... *G06F 3/0653* (2013.01); *G06F 3/0659* (2013.01); *G06F 3/0673* (2013.01); *G06F 9/30047* (2013.01)

(58) Field of Classification Search
CPC ......... G06F 12/0802; G06F 2212/1044; G06F 3/0652; G06F 3/0653; G06F 3/0679; G06F 3/0685; G06F 12/0868; G06F 12/0871; G06F 3/0604; G06F 3/0634; G06F 3/0673; G06F 12/0891; G06F 13/28; G06F 2212/1016; G06F 12/0246; G06F 12/0284; G06F 12/0292; G06F 12/0897; G06F 12/122; G06F 12/127; G06F 2212/205; G06F 2212/608; G06F 2212/7201; G06F 2212/7203; G06F 3/0613; G06F 3/0644; G06F 3/0649
See application file for complete search history.

(56) References Cited

U.S. PATENT DOCUMENTS

| | | |
|---|---|---|
| 2019/0012081 A1 | 1/2019 | Lee et al. |
| 2019/0236020 A1 | 8/2019 | Jang |
| 2019/0354311 A1 | 11/2019 | Ji et al. |
| 2021/0149800 A1* | 5/2021 | Yang .................. G06F 12/0246 |

\* cited by examiner

| Physical address | Logical address | Access count value |
|---|---|---|
| PADD1 | LADD1 | 40 |
| PADD2 | LADD4 | 30 |
| PADD3 | LADD5 | 80 |
| PADD4 | LADD2 | 100 |
| PADD5 | LADD8 | 20 |
| PADD6 | LADD3 | 40 |
| PADD7 | LADD7 | 30 |
| PADD8 | LADD6 | 80 |

< address mapping information >

| |
|---|
| PADD1 |
| PADD2 |
| PADD3 |
| PADD4 |
| PADD5 |
| PADD6 |
| PADD7 |
| PADD8 |

< BLK >

MEMORY CONTROLLER AND METHOD OF OPERATING THE SAME

CROSS-REFERENCE TO RELATED APPLICATION

The present application is a continuation of U.S. patent application Ser. No. 16/904,055 filed on Jun. 17, 2020, which claims priority under 35 U.S.C. § 119(a) to Korean patent application number 10-2019-0165954, filed on Dec. 12, 2019, which is incorporated herein by reference in its entirety.

BACKGROUND

Field of Invention

The present disclosure relates to a memory controller and a method of operating the same, and more particularly, to a memory controller that performs a program operation and a method of operating the same.

Description of Related Art

A memory system may include a memory device and a memory controller.

The memory controller may control an operation of the memory device in response to a request of a host. The memory device may store data or output stored data under control of the memory controller. For example, the memory device may be a volatile memory device in which stored data is lost when the power supply is cut off, or a non-volatile memory device in which stored data is maintained even though the power supply is cut off.

SUMMARY

Embodiments of the present disclosure provide a memory controller and a method of operating the same, capable of improving a program speed.

A memory controller according to an embodiment of the present disclosure may include a block manager configured to designate a first memory block, which is driven to program m-bit data per cell, as an open block where m is a natural number, an address manager configured to increase an access count value corresponding to a logical address for the first memory block whenever a program request or a read request including the logical address is received from a host, and a data manager configured to determine a representative attribute of data programmed in the first memory block based on access count values corresponding to the logical addresses for the first memory block when a flush request is received from the host. The block manager may determine whether to designate a new open block according to the determined representative attribute.

A method of operating a memory controller according to an embodiment of the present disclosure may include designating a first memory block, which is driven to program m-bit data per cell, as an open block where m is a natural number, increasing an access count value corresponding to a logical address for the first memory block whenever a program request or a read request including the logical address is received from a host, determining a representative attribute of data programmed in the first memory block based on access count values for the logical addresses corresponding to the first memory block when a flush request is received from the host, and determining whether to designate a new open block according to the determined representative attribute.

A memory system according to an embodiment of the present disclosure may include a memory device including first and second regions, the first region having lower-level cells than the second region; and a controller suitable for: Increasing a number of accesses for a piece of data stored within a first storage unit in the first region whenever accessing the piece, controlling the memory device to migrate plural pieces of data from the first storage unit to the second region when the total number of accesses corresponding to the first storage unit is less than a threshold, and opening a second storage unit and closing the first storage unit, within the first region, when the total number of accesses corresponding to the first storage unit is greater than or equal to the threshold.

According to the present technology, program speed may be improved during a program operation.

DETAILED DESCRIPTION

Figure 1:
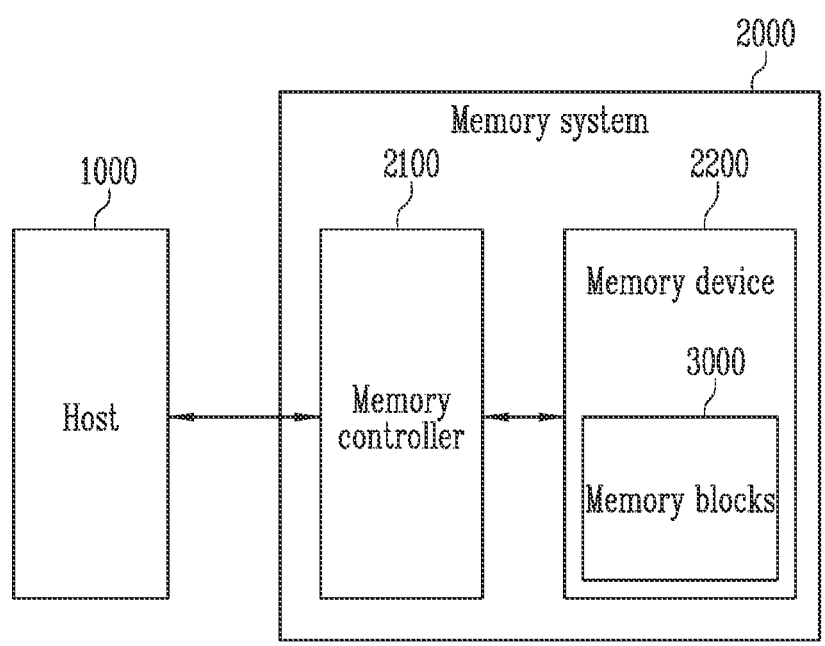
FIG. 1 is a diagram for describing a memory system according to an embodiment of the present disclosure.

Specific structural or functional descriptions of embodiments according to the concept which are disclosed in the present specification or application, are illustrated only to describe the embodiments according to the concept of the present disclosure. The embodiments according to the concept of the present disclosure may be carried out in various forms and the descriptions are not limited to the embodiments described in the present specification or application.

FIG. 1 is a diagram for describing a memory system according to an embodiment of the present disclosure.

The memory system 2000 may include a memory device 2200 in which data is stored and a memory controller 2100 that controls the memory device 2200 according to a request of a host 1000.

The host 1000 may be a device or a system that stores data in the memory system 2000 or retrieves data from the memory system 2000. For example, the host 1000 may include at least one of a computer, a portable digital device, a tablet, a digital camera, a digital audio player, a television, a wireless communication device, and a cellular phone, but embodiments of the present disclosure are not limited thereto.

The memory controller 2100 may control an operation of the memory device 2200. The operation of the memory device 2200 may include, for example, a program operation, a read operation, and an erase operation.

The memory controller 2100 may transmit at least one of a command, an address, or data to the memory device 2200 to control the operation of the memory device 2200.

The memory controller 2100 may designate at least one memory block as an open block among free blocks included in memory blocks 3000, and may perform the program operation on the at least one memory block designated as the open block.

The memory device 2200 may perform at least one operation among the program operation, the read operation, and the erase operation under the control of the memory controller 2100. For example, the memory device 2200 may receive a program command, the address, and the data from the memory controller 2100, and store the data according to the program command and the address. For example, the memory device 2200 may perform the read operation according to a read command and the address received from the memory controller 2100, and provide read data to the memory controller 2100. For example, the memory device 2200 may perform the erase operation according to an erase command and the address received from the memory controller 2100.

The memory device 2200 may be a volatile memory device in which stored data is lost when the power supply is cut off, or a non-volatile memory device in which stored data is maintained even though the power supply is cut off. The memory device 2200 may include a plurality of memory blocks 3000.

Figure 2:
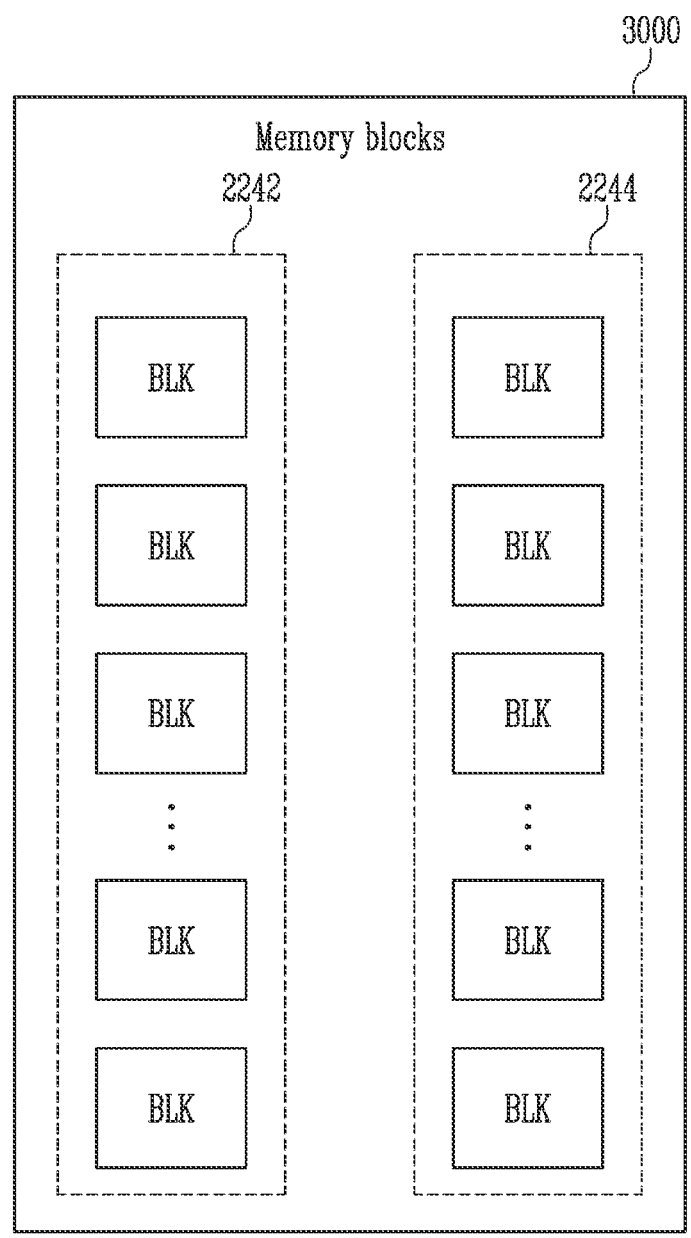
FIG. 2 is an example diagram for describing memory blocks shown in FIG. 1.

FIG. 2 is an example diagram for describing the memory blocks shown in FIG. 1.

The memory blocks 3000 may include a first memory block group 2242 and a second memory block group 2244.

Each of the memory blocks BLK included in the first memory block group 2242 may be a memory block driven to program m-bit data per cell. Here, m may be a natural number. For example, each of the memory blocks BLK included in the first memory block group 2242 may be a single-level cell (SLC) block driven to program 1-bit data per cell, a multi-level cell (MLC) block driven to program 2-bit data per cell, or a triple-level cell (TLC) block driven to program 3-bit data per cell. However, the embodiment is not limited thereto and may be driven to program any number of bits of data per cell, depending on design. Furthermore, 'MLC' may not just refer to a block driven to program 2-bit data per cell, but may also refer to any block driven to program 2 or more bits of data per cell. For example, a TLC block may also be referred to as a 3-bit MLC block.

Each of the memory blocks BLK included in the second memory block group 2244 may be a memory block driven to program n-bit data per cell. Here, n may be a natural number greater than m. For example, when each of the memory blocks BLK included in the first memory block group 2242 is the SLC block, each of the memory blocks BLK included in the second memory block group 2244 may be 2-bit MLC block or a 3-bit MLC block. For example, when each of the memory blocks BLK included in the first memory block group 2242 is the 2-bit MLC block, each of the memory blocks BLK included in the second memory block group 2244 may be a 3-bit MLC block or a 4-bit MLC block (which may be referred to as a quad-level cell (QLC) block) driven to program 4-bit data per cell.

One logical page data may be stored in each of physical pages included in each of the SLC blocks. The one logical page data may include data having as many bits as the number of memory cells included in one physical page.

Two logical page data may be stored in each of physical pages included in the 2-bit MLC block, three logical page data may be stored in each of physical pages included in the 3-bit MLC block, and four logical page data may be stored in each of physical pages included in the 4-bit MLC blocks.

As the number of bits programmed per cell increases, the number of data that may be stored in the memory block increases, but a time required for the program operation may be increased and reliability of the data may be reduced.

In order to reduce the time required for the program operation while ensuring the reliability of the data, a turbo write technique (which may be referred to as a write booster technique) may be used. For example, the turbo write technique may be a technique of performing the program operation on the single-level cell (SLC) block and migrating the data programmed in the SLC block to the multi-level cell (MLC) block at an idle time of the memory device. When the turbo write technique is used, the speed performance is the same as programming the data in the SLC block and programming large capacity data in the MLC block.

Figure 3:
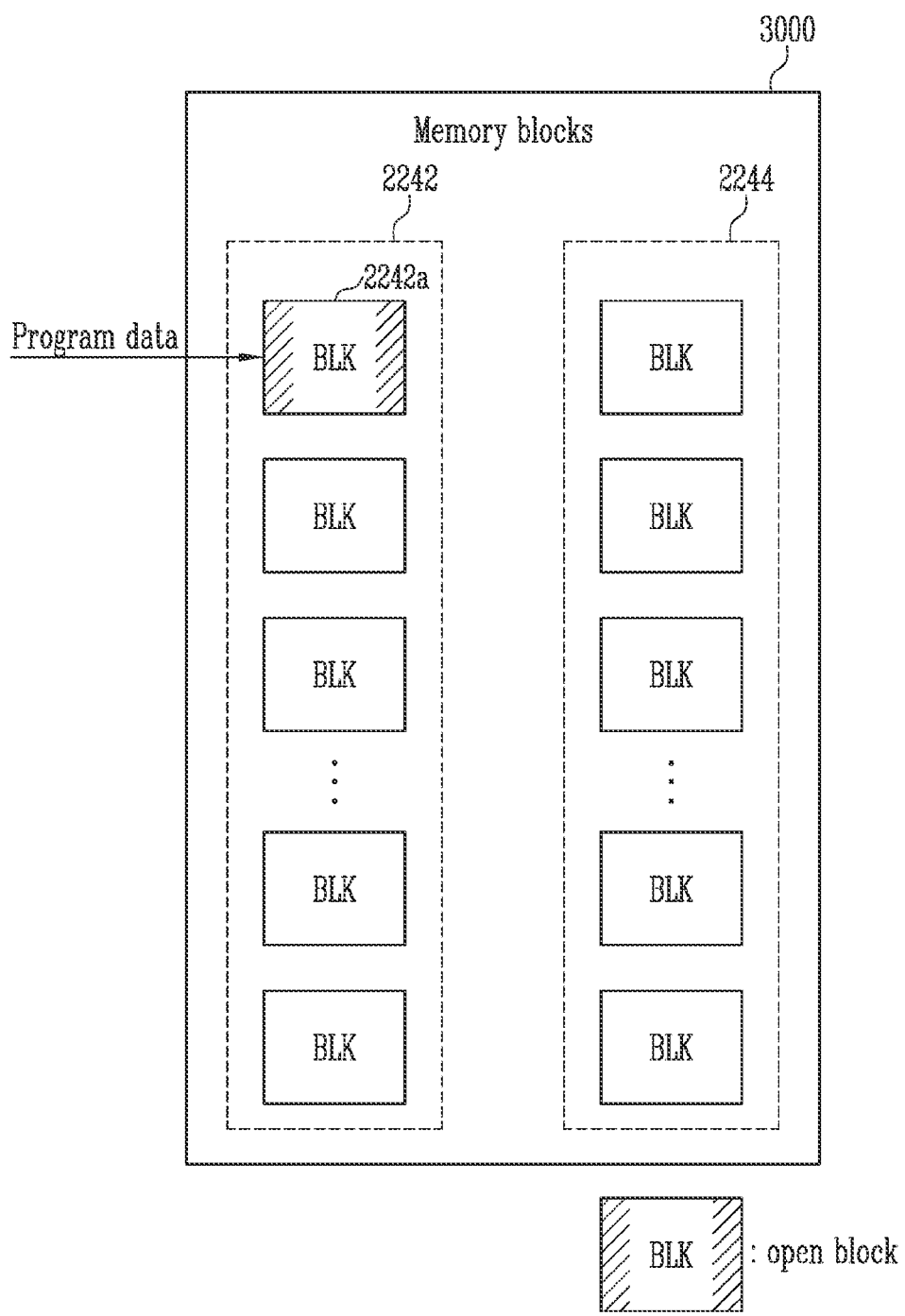
FIG. 3 is an example diagram for describing designation of an open block according to an embodiment of the present disclosure.

FIG. 3 is an example diagram for describing the designation of the open block according to an embodiment of the present disclosure.

At least one memory block among the memory blocks BLK included in the memory device 2200 may be designated as the open block. The open block is a memory block designated among the free blocks to perform the program operation, and may be a memory block in which data is not programmed in all pages or data is programmed in some pages. That is, the open block may be a memory block on which the program operation is not yet performed but is designated to perform the program operation, or a memory block on which the program operation is being performed. The free block may be a memory block that is not designated as the open block among the memory blocks in which the data is not programmed.

In an embodiment, at least one memory block among the memory blocks BLK included in the first memory block group 2242 may be designated as the open block. FIG. 3 shows an example in which one memory block 2242a is designated as the open block, but embodiments of the present disclosure are not limited thereto.

When program data is received together with a program request from the host, the memory controller 2100 may program the program data into the memory block 2242a designated as the open block.

Figure 4:
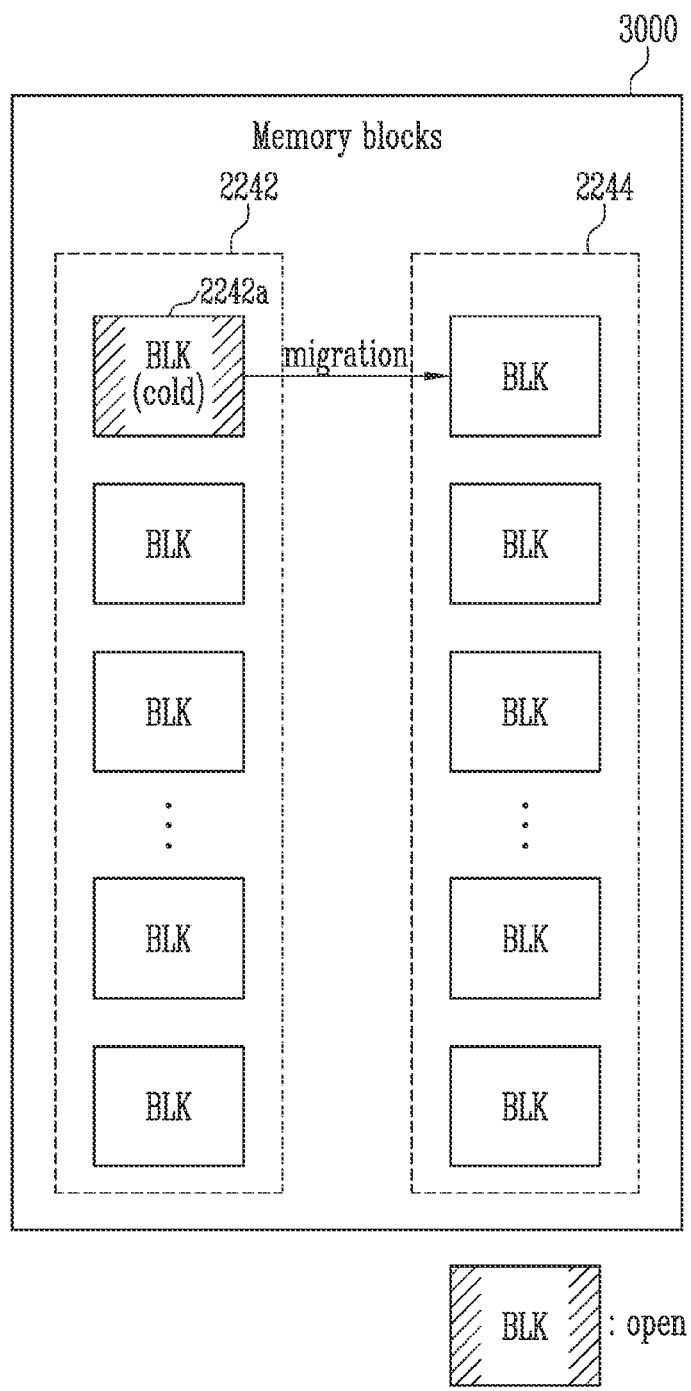
FIG. 4 is an example diagram for describing data migration according to an embodiment of the present disclosure.

FIG. 4 is an example diagram for describing data migration according to an embodiment of the present disclosure.

The memory controller 2100 may perform the data migration which migrates data programmed in a memory block 2242a designated as the open block among the memory blocks BLK included in the first memory block group 2242 to any one memory block among the memory blocks BLK included in the second memory block group 2244.

In an embodiment, the data migration may be performed when a set event occurs. The set event may include, for example, a flush request received from the host 1000.

For example, the host 1000 may transmit the flush request, for flushing program data programmed in the memory block 2242a designated as the open block to the memory block BLK included in the second memory block group 2244, to the memory controller 2100.

In an embodiment, the data migration may be performed by further considering an attribute of the data programmed in the memory block 2242a designated as the open block. The attribute of the data may include a hot attribute and a cold attribute. Hot data (i.e., data of the hot attribute) may be data, to which a number of accesses reaches a predetermined threshold or greater, i.e., frequently accessed data. Cold data (i.e., data of the cold attribute) may be data, to which a number of accesses is less than the predetermined threshold, i.e., infrequently accessed data. It may be determined whether data is hot data or cold data based on history information representing a number of access-requested addresses corresponding to the data, the access-requested address being any one between a physical address and a logical address.

In an embodiment, when the attribute of the data programmed in the memory block 2242a designated as the open block is the cold attribute, the data migration may be performed.

In an embodiment, the attribute of data having an access count value corresponding to the logical address which is equal to or greater than a first threshold value may be determined as the hot attribute, and the attribute of data having an access count value corresponding to the logical address which is less than the first threshold value may be determined as the cold attribute.

In an embodiment, when data having attributes which are different from each other are programmed in the memory block 2242a designated as the open block, a representative attribute of the corresponding data may be determined, and when the determined representative attribute is the cold attribute, the data migration may be performed.

In an embodiment, when the number of data corresponding to the cold attribute is greater than number of data corresponding to the hot attribute among the data programmed in the memory block 2242a designated as the open block, the representative attribute of the data programmed in the memory block 2242a designated as the open block may be determined as the cold attribute. On the other hand, when the number of data corresponding to the hot attribute is greater than number of data corresponding to the cold attribute among the data programmed in the memory block 2242a designated as the open block, the representative attribute of the data programmed in the memory block 2242a designated as the open block may be determined as the hot attribute.

In an embodiment, when an average of access count values corresponding to logical addresses corresponding to all data programmed in the memory block 2242a designated as the open block is equal to or greater than a first threshold value, the representative attribute of the data programmed in the memory block 2242a designated as the open block may be determined as the hot attribute. On the other hand, when the average of the access count values corresponding to the logical addresses corresponding to all data programmed in the memory block 2242a designated as the open block is less than the first threshold value, the representative attribute of the data programmed in the memory block 2242a designated as the open block may be determined as the cold attribute.

Figure 5:
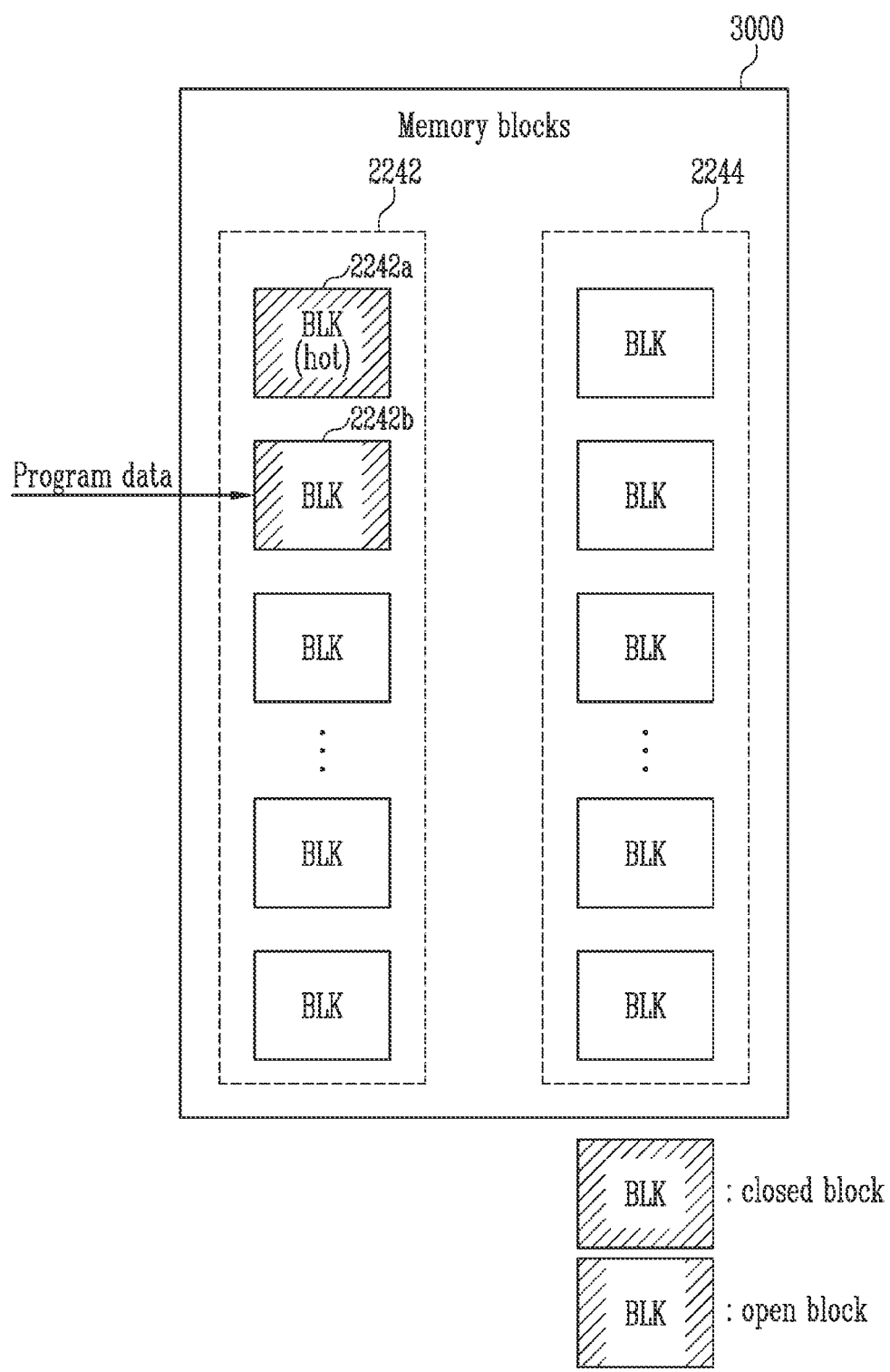
FIG. 5 is an example diagram for describing designation of a new open block according to an embodiment of the present disclosure.

FIG. 5 is an example diagram for describing the designation of a new open block according to an embodiment of the present disclosure.

In response to the flush request for flushing the program data programmed in the memory block 2242a designated as the open block to the memory block BLK included in the second memory block group 2244, the memory controller 2100 may open, within the first memory block group 2242, another memory block while closing the memory block 2242a, rather than migrating the data from the memory block 2242a to the memory block BLK included in the second memory block group 2244, which may accelerate a response to the flush request thereby improving a program speed since the data migration operation is skipped despite the flush request.

For example, based on the attribute of the data programmed in the memory block 2242a designated as the open block the memory controller 2100 may not perform the data migration from the memory block 2242a to the second memory block group 2244 but may designate any one memory block 2242b among the memory blocks included in the first memory block group 2242 as a new open block.

In an embodiment, when the attribute of the data programmed in the memory block 2242a designated as the open block is the hot attribute, the memory controller 2100 may not perform the data migration but may designate any one memory block 2242b among the memory blocks included in the first memory block group 2242 as the new open block.

In an embodiment, when the data of which the attributes are different from each other are programmed in the memory block 2242a designated as the open block, the memory controller 2100 may determine the representative attribute of the corresponding data. When the determined representative attribute is the hot attribute, the memory controller 2100 may not perform the data migration but may designate the new open block. The determination of the representative attribute is as described with reference to FIG. 4.

In an embodiment, when the new open block 2242b is designated, the existing open block 2242a may be designated as a closed block. The closed block may be a memory block in which the program operation is not performed until the erase operation is performed.

Figures 6, 7:
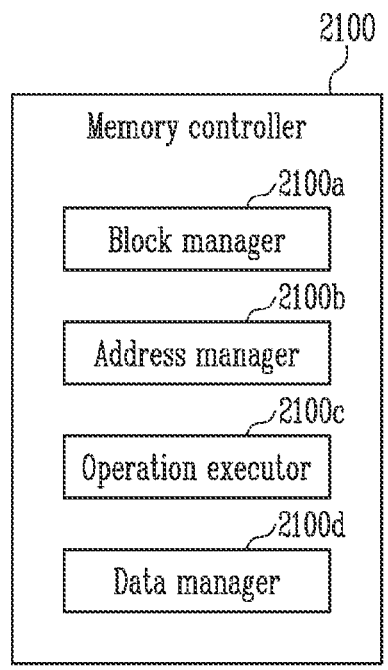
FIG. 6 is an example diagram for describing address mapping information according to an embodiment of the present disclosure.
FIG. 7 is an example diagram for describing a memory controller shown in FIG. 1.

FIG. 6 is an example diagram for describing address mapping information according to an embodiment of the present disclosure.

The memory controller 2100 may manage mapping information between the logical address received from the host 1000 and the physical addresses corresponding to storage areas included in the memory block. Each of the storage areas may correspond to one physical page included in the memory block, but embodiments of the present disclosure are not limited thereto.

For example, when the program request is received from the host 1000, the memory controller 2100 may map a logical address included in the received program request to a new physical address, and may perform the program operation on a storage area corresponding to the mapped physical address.

For example, when the read request is received from the host 1000, the memory controller 2100 may identify a physical address corresponding to a logical address included in the received read request, and may perform the read operation on a storage area corresponding to the identified physical address.

When a logical address corresponding to the memory block 2242*a* designated as the open block is received, the memory controller 2100 may increase an access count value corresponding to the received logical address by, for example, one. The logical address may be included in the program request or the read request and may be received.

FIG. 6 shows an example in which logical addresses LADD1 to LADD8 and an access count value are mapped in correspondence with physical addresses PADD1 to PADD8 corresponding to storage areas included in the memory block 2242*a* designated as the open block.

FIG. 7 is an example diagram for describing the memory controller shown in FIG. 1.

The memory controller 2100 may include a block manager 2100*a*, an address manager 2100*b*, an operation executor (operation performer) 2100*c*, and a data manager 2100*d*.

The block manager 2100*a* may designate a first memory block as the open block among the memory blocks driven to program m-bit data per cell. Here, m may be a natural number. The block manager 2100*a* may control the operation executor 2100*c* to perform the program operation on the first memory block designated as the open block.

The block manager 2100*a* may determine the designation of the new open block or the data migration according to the representative attribute of the data programmed in the first memory block.

In an embodiment, when the representative attribute of the data programmed in the first memory block is the hot attribute, the block manager 2100*a* may designate a second memory block among the memory blocks driven to program m-bit data per cell as the new open block. At this time, the block manager 2100*a* may change the first memory block from the open block to the closed block. The block manager 2100*a* may control the operation executor 2100*c* to perform the program operation on the second memory block designated as the new open block.

In an embodiment, when the representative attribute of the data programmed in the first memory block is the cold attribute, the block manager 2100*a* may determine to migrate the data programmed in the first memory block to a third memory block in which n-bit data is stored per cell. Here, n may be a natural number greater than m. The block manager 2100*a* may control the operation executor 2100*c* to migrate the data programmed in the first memory block to the third memory block. At this time, the first memory block may be maintained as the open block.

When a physical address is not mapped to the logical address included in the program request received from the host 1000, the address manager 2100*b* may allocate a physical address corresponding to the logical address. The address manager 2100*b* may provide the allocated physical address to the operation executor 2100*c* so that the program operation may be performed in a storage area corresponding to the allocated physical address.

When the physical address is mapped to the logical address included in the program request received from the host 1000, the address manager 2100*b* may invalidate the mapped physical address and may allocate a new physical address corresponding to the logical address. The address manager 2100*b* may provide the allocated new physical address to the operation executor 2100*c* so that the program operation may be performed in a storage area corresponding to the allocated new physical address.

The address manager 2100*b* may identify a physical address corresponding to the logical address included in the read request received from the host 1000, and may provide the identified physical address to the operation executor 2100*c* so that the read operation may be performed on a storage area corresponding to the identified physical address.

In an embodiment, the address manager 2100*b* may manage mapping information in which the logical address received from the host 1000 and the access count value corresponding to the logical address are mapped with each other, in correspondence with each of the physical addresses corresponding to the memory block designated as the open block.

In an embodiment, whenever the program request or the read request is received from the host 1000, the address manager 2100*b* may increase the access count value corresponding to the logical address included in the received request. For example, the address manager 2100*b* may increase the access count value corresponding to the logical address included in the program request or the read request received from the host 1000 by one.

The operation executor 2100*c* may perform at least one of the program operation or the read operation on the memory block designated as the open block.

The data manager 2100*d* may determine the representative attribute of the data programmed in the first memory block, and provide information on the determined representative attribute to the block manager 2100*a*. The determination of the representative attribute may be performed when the set event occurs. For example, when the flush request is received from the host 1000, the data manager 2100*d* may determine the representative attribute of the data programmed in the first memory block.

In an embodiment, the data manager 2100*d* may determine the representative attribute of the data programmed in the first memory block based on the access count value corresponding to each of the logical addresses corresponding to the data programmed in the first memory block.

In an embodiment, when the number of logical addresses corresponding to the access count value equal to or greater than the first threshold value is greater than the number of logical addresses corresponding to the access count value less than the first threshold value, among the logical addresses corresponding to the data programmed in the first memory block, the data manager 2100*d* may determine the representative attribute of the data programmed in the first memory block as the hot attribute. In contrast, when the number of logical addresses corresponding to the access count value equal to or greater than the first threshold value is less than the number of logical addresses corresponding to the access count value less than the first threshold value, among the logical addresses corresponding to the data programmed in the first memory block, the data manager 2100*d* may determine the representative attribute of the data programmed in the first memory block as the cold attribute.

In an embodiment, when an average value of the access count values corresponding to the logical addresses corresponding to the data programmed in the first memory block is equal to or greater than the first threshold value, the data manager 2100*d* may determine the representative attribute of the data programmed in the first memory block as the hot attribute. In contrast, when the average value of the access count values corresponding to the logical addresses corresponding to the data programmed in the first memory block is less than the first threshold value, the data manager 2100d may determine the representative attribute of the data programmed in the first memory block as the cold attribute.

Figure 8:
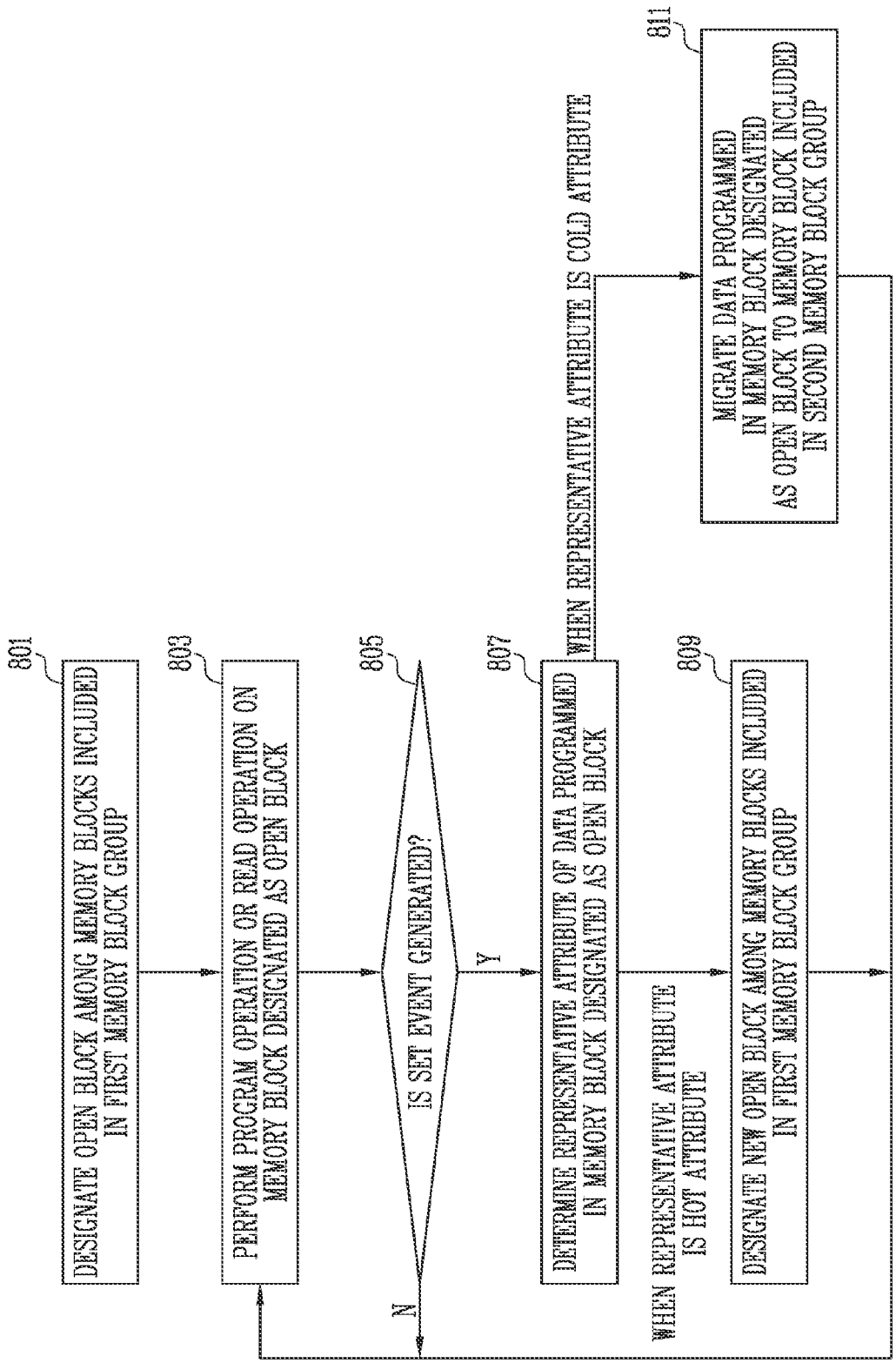
FIG. 8 is a flowchart for describing a method of operating the memory controller shown in FIG. 7.

FIG. 8 is a flowchart for describing a method of operating the memory controller shown in FIG. 7.

In step 801, the memory controller 2100 may designate any one memory block among the memory blocks included in the first memory block group as the open block. Each of the memory blocks included in the first memory block group may be memory blocks driven to program m-bit data per cell. Here, m may be a natural number.

In step 803, the memory controller 2100 may perform the program operation or the read operation on the memory block designated as the open block. For example, the memory controller 2100 may perform the program operation or the read operation according to the program request or the read request received from the host 1000. The memory controller 2100 may increase the access count value corresponding to the logical address included in the program request or the read request, for example, by one.

In step 805, the memory controller 2100 may determine whether the set event occurs. For example, the set event may be the flush request received from the host 1000. When it is determined that the set event occurs, step 807 may be performed, otherwise step 803 may be performed.

In step 807, the memory controller 2100 may determine the representative attribute of the data programmed in the memory block designated as the open block. The determination of the representative attribute may be performed based on the access count values corresponding to the logical addresses corresponding to the memory block designated as the open block. When the representative attribute of the data programmed in the memory block designated as the open block is determined as the hot attribute, step 809 may be performed, and when the representative attribute of the data programmed in the memory block designated as the open block is determined as the cold attribute, step 811 may be performed.

In step 809, the memory controller 2100 may designate the new open block among the memory blocks included in the first memory block group. At this time, the memory controller 2100 may change the memory block previously designated as the open block to the closed block. Thereafter, step 803 may be performed.

Meanwhile, in step 811, the memory controller 2100 may migrate the data programmed in the memory block designated as the open block to the memory block included in the second memory block group. The memory block included in the second memory block group may be the memory block driven to program n-bit data per cell. Here, n may be a natural number greater than m. Thereafter, step 803 may be performed.

Figure 9:
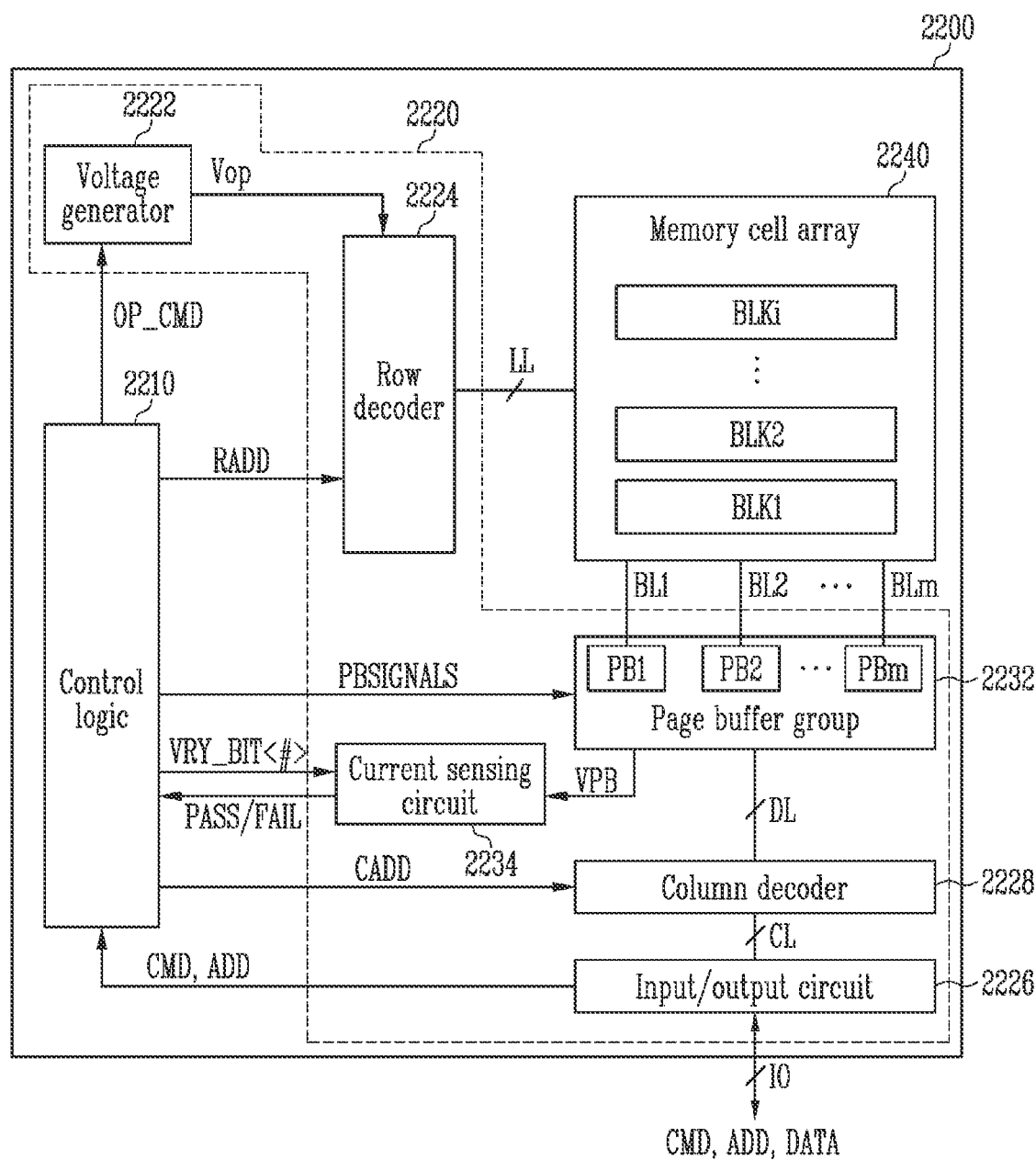
FIG. 9 is an example diagram for describing the memory device shown in FIG. 1.

FIG. 9 is an example diagram for describing the memory device shown in FIG. 1.

The memory device 2200 may include a control logic 2210, peripheral circuits 2220, and a memory cell array 2240.

The control logic 2210 may control the peripheral circuits 2220 under the control of the memory controller 2100.

The control logic 2210 may control the peripheral circuits 2220 in response to the command CMD and the address ADD received from the memory controller 2100 through the input/output circuit 2226. For example, the control logic 2210 may output an operation signal OP_CMD, a row address RADD, a column address CADD, page buffer control signals PBSIGNALS and a permission bit VRY_BIT<#> in response to the command CMD and the address ADD. The control logic 2210 may determine whether a verify operation is passed or failed in response to a pass signal PASS or a fall signal FAIL received from the current sensing circuit 2234.

The peripheral circuits 2220 may perform a program operation of storing data in the memory cell array 2240, a read operation of outputting data stored in the memory cell array 2240, and an erase operation of erasing the data stored in the memory cell array 2240.

The peripheral circuits 2220 may include a voltage generation circuit (voltage generator) 2222, a row decoder 2224, an input/output circuit 2226, a column decoder 2228, a page buffer group 2232, and a current sensing circuit 2234.

The voltage generation circuit 2222 may generate various operation voltages Vop used for the program operation, the read operation, and the erase operation in response to the operation signal OP_CMD received from the control logic 2210. For example, the voltage generation circuit 2222 may transfer a program voltage, a verify voltage, a pass voltage, a read voltage, an erase voltage, a turn-on voltage, and the like to the row decoder 2224.

The row decoder 2224 may transfer the operation voltages Vop to local lines LL connected to a selected memory block among memory blocks included in the memory cell array 2240 in response to the row address RADD received from the control logic 2210. The local lines LL may include local word lines, local drain select lines, and local source select lines. In addition, the local lines LL may include various lines connected to a memory block such as a source line.

The input/output circuit 2226 may transfer the command CMD and the address ADD received from the memory controller through input/output lines IO to the control logic 2210 or exchange data DATA with the column decoder 2228.

The column decoder 2228 may transfer data between the input/output circuit 2226 and the page buffer group 2232 in response to the column address CADD received from the control logic 2210. For example, the column decoder 2228 may exchange data with page buffers PB1 to PBm through data lines DL, or exchange data with the input/output circuit 2226 through the column lines CL.

The page buffer group 2232 may be connected to bit lines BL1 to BLm commonly connected to memory blocks BLK1 to BLKi. The page buffer group 2232 may include a plurality of page buffers PB1 to PBm connected to the bit lines BL1 to BLm. For example, one page buffer may be connected to each bit line. The page buffers PB1 to PBm may operate in response to the page buffer control signals PBSIGNALS received from the control logic 2210. For example, during the program operation, the page buffers PB1 to PBm may temporarily store program data received from the memory controller and adjust a voltage applied to the bit lines BL1 to BLm according to the program data. In addition, during the read operation, the page buffers PB1 to PBm may temporarily store data received through the bit lines BL1 to BLm or may sense a voltage or a current of the bit lines BL1 to BLm.

During the read operation or the verify operation, the current sensing circuit 2234 may generate a reference current in response to the permission bit VRY_BTI<#> received from the control logic 2210, and compare a reference voltage generated by a reference current with a sensing voltage VPB received from the page buffer group 2232 to output the pass signal PASS or the fall signal FAIL.

The memory cell array 2240 may include a plurality of memory blocks BLK1 to BLKi in which data is stored. The memory blocks BLK1 to BLKi may store user data and various pieces of information necessary for the operation of the non-volatile memory device 2200. The memory blocks BLK1 to BLKi may be implemented in a two-dimensional structure or a three-dimensional structure, and may be configured identically to each other.

The memory blocks BLK1 to BLKi may be the memory blocks 3000 described with reference to FIGS. 1 to 5.

Figure 10:
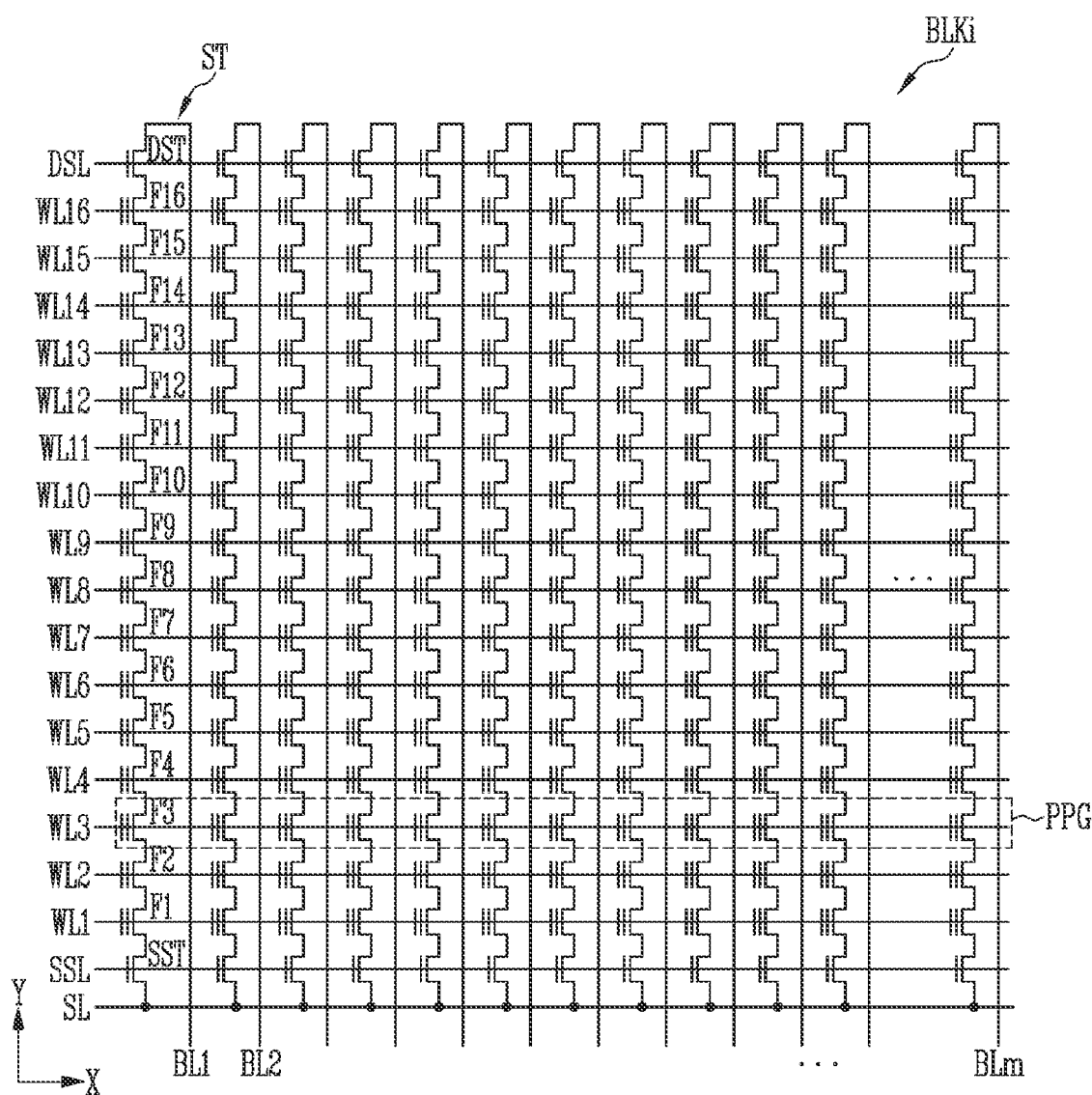
FIG. 10 is an example diagram for describing a memory block.

FIG. 10 is an example diagram for describing a memory block.

The memory cell array 2240 may include a plurality of memory blocks, and FIG. 10 shows any one memory block BLKi among the plurality of memory blocks BLK1 to BLKi shown in FIG. 9 for convenience of description.

A plurality of word lines arranged in parallel to each other between a first select line and a second select line may be connected to the memory block BLKi. Here, the first select line may be a source select line SSL, and the second select line may be a drain select line DSL. Specifically, the memory block BLKi may include a plurality of strings ST connected between the bit lines BL1 to BLm and a source line SL. The bit lines BL1 to BLm may be connected to the strings ST, respectively, and the source line SL may be commonly connected to the strings ST. Since the strings ST may be configured identically to each other, the string ST connected to the first bit line BL1 will be specifically described as an example.

The string ST may include a source select transistor SST, a plurality of memory cells F1 to F16, and a drain select transistor DST connected in series between the source line SL and the first bit line BL1. One string ST may include at least one source select transistor SST and at least one drain select transistor DST, and may include memory cells having a number greater than the number of memory cells F1 to F16 shown in the drawing.

A source of the source select transistor SST may be connected to the source line SL, and a drain of the drain select transistor DST may be connected to the first bit line BL1. The memory cells F1 to F16 may be connected in series between the source select transistor SST and the drain select transistor DST. Gates of the source select transistors SST included in different strings ST may be connected to the source select line SSL, gates of the drain select transistors DST may be connected to the drain select line DSL, and gates of the memory cells F1 to F16 may be connected to a plurality of word lines WL1 to WL16. A group of memory cells connected to the same word line among memory cells included in different strings ST may be referred to as a physical page PPG. Therefore, the memory block BLKi may include as many physical pages PPG as the number of word lines WL1 to WL16.

Figure 11:
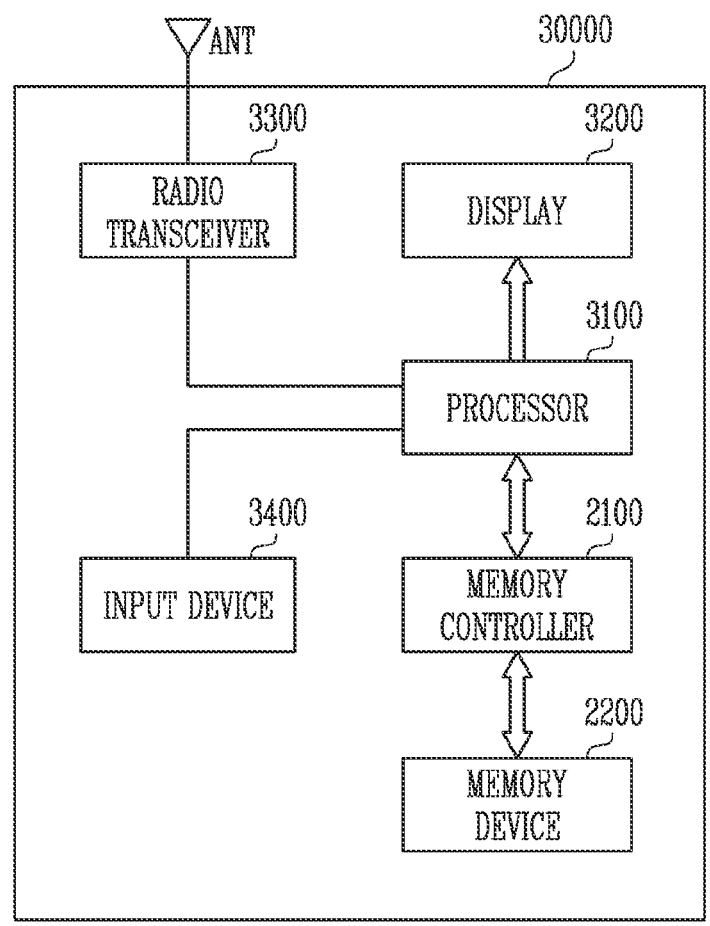
FIG. 11 is a diagram for describing another example of the memory system including the memory controller shown in FIG. 7.

FIG. 11 is a diagram for describing another example of the memory system including the memory controller shown in FIG. 7.

The memory system 30000 may be implemented as a cellular phone, a smart phone, a tablet, a personal computer (PC), a personal digital assistant (PDA), or a wireless communication device. The memory system 30000 may include the memory device 2200 and the memory controller 2100 that controls the operation of the memory device 2200.

The memory controller 2100 may control a data access operation, for example, a program operation, an erase operation, a read operation, or the like, of the memory device 2200 under control of a processor 3100.

Data programmed in the memory device 2200 may be output through a display 3200 under the control of the memory controller 2100.

A radio transceiver 3300 may transmit and receive a radio signal through an antenna ANT. For example, the radio transceiver 3300 may convert a radio signal received through the antenna ANT into a signal that may be processed by the processor 3100. Therefore, the processor 3100 may process the signal output from the radio transceiver 3300 and transmit the processed signal to the memory controller 2100 or the display 3200. The memory controller 2100 may transmit the signal processed by the processor 3100 to the memory device 2200. In addition, the radio transceiver 3300 may convert a signal output from the processor 3100 into a radio signal, and output the converted radio signal to an external device through the antenna ANT. An input device 3400 may be a device capable of inputting a control signal for controlling the operation of the processor 3100 or data to be processed by the processor 3100. The input device 3400 may be implemented as a device such as a touch pad, a computer mouse, a keypad, or a keyboard. The processor 3100 may control an operation of the display 3200 so that data output from the memory controller 2100, data output from the radio transceiver 3300, or data output from the input device 3400 is output through the display 3200.

According to an embodiment, the memory controller 2100 capable of controlling the operation of memory device 2200 may be implemented as a part of the processor 3100 and may be implemented as a chip separate from the processor 3100.

Figure 12:
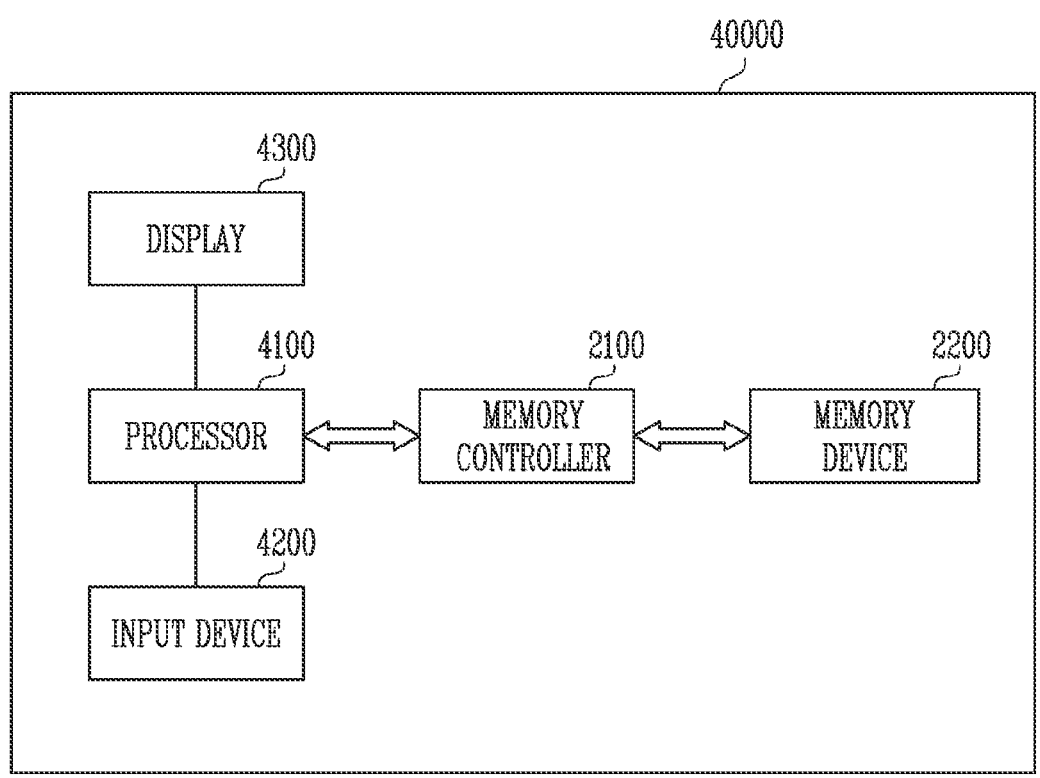
FIG. 12 is a diagram for describing another example of the memory system including the memory controller shown in FIG. 7.

FIG. 12 is a diagram for describing another example of the memory system including the memory controller shown in FIG. 7.

The memory system 40000 may be implemented as a personal computer (PC), a tablet, a net-book, an e-reader, a personal digital assistant (PDA), a portable multimedia player (PMP), an MP3 player, or an MP4 player.

The memory system 40000 may include the memory device 2200 and the memory controller 2100 controlling a data process operation of the memory device 2200.

A processor 4100 may output data stored in the memory device 2200 through a display 4300, according to data input through an input device 4200. For example, the input device 4200 may be implemented as a device such as a touch pad, a computer mouse, a keypad, or a keyboard.

The processor 4100 may control the overall operation of the memory system 40000 and control the operation of the memory controller 2100. According to an embodiment, the memory controller 2100 capable of controlling the operation of memory device 2200 may be implemented as a part of the processor 4100 or may be implemented as a chip separate from the processor 4100.

Figure 13:
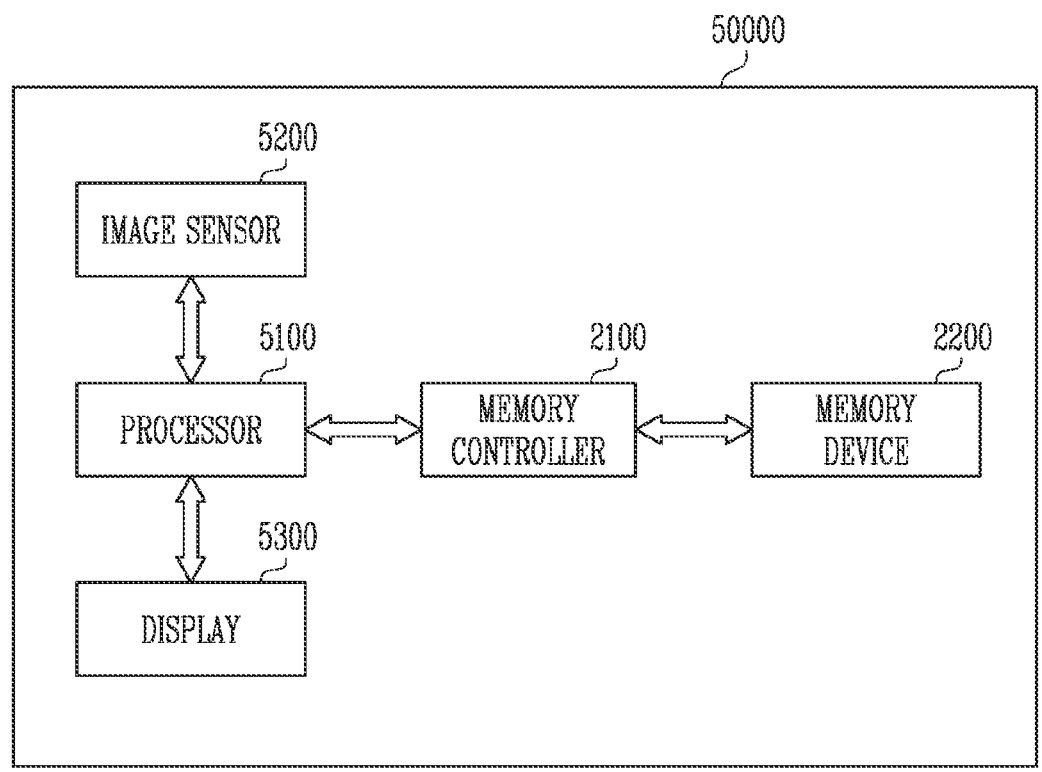
FIG. 13 is a diagram for describing another example of the memory system including the memory controller shown in FIG. 7.

FIG. 13 is a diagram for describing another example of the memory system including the memory controller shown in FIG. 7.

The memory system 50000 may be implemented as an image processing device, for example, a digital camera, a portable phone provided with a digital camera, a smart phone provided with a digital camera, or a tablet provided with a digital camera.

The memory system 50000 includes the memory device 2200 and the memory controller 2100 capable of controlling a data process operation, for example, a program operation, an erase operation, or a read operation, of the memory device 2200.

An image sensor 5200 may convert an optical image into digital signals. The converted digital signals may be transmitted to a processor 5100 or the memory controller 2100. Under control of the processor 5100, the converted digital signals may be output through a display 5300 or stored in the memory device 2200 through the memory controller 2100.

Data stored in the memory device 2200 may be output through the display 5300 under the control of the processor 5100 or the memory controller 2100.

According to an embodiment, the memory controller 2100 capable of controlling the operation of memory device 2200 may be implemented as a part of the processor 5100 or may be implemented as a chip separate from the processor 5100.

Figure 14:
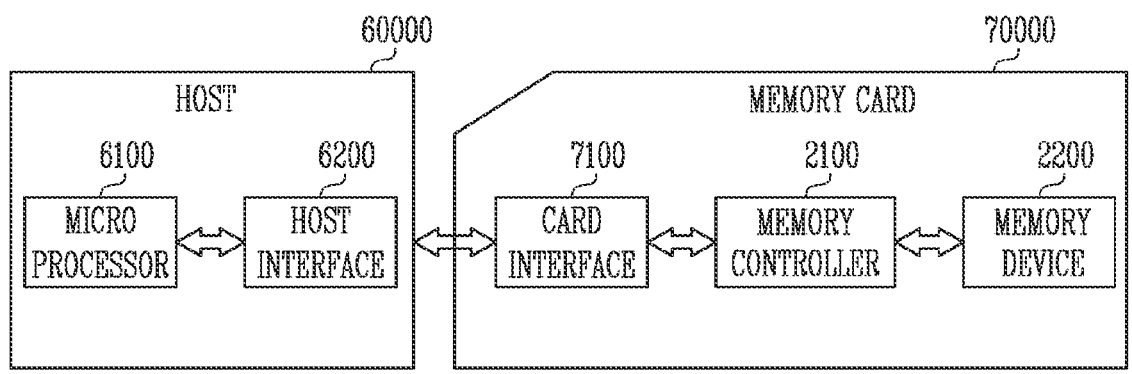
FIG. 14 is a diagram for describing another example of the memory system including the memory controller shown in FIG. 7.

FIG. 14 is a diagram for describing another example of the memory system including the memory controller shown in FIG. 7.

The memory system 70000 may be implemented as a memory card or a smart card. The memory system 70000 may include the memory device 2200, the memory controller 2100, and a card interface 7100.

The memory controller 2100 may control data exchange between the memory device 2200 and the card interface 7100. According to an embodiment, the card interface 7100 may be a secure digital (SD) card interface or a multi-media card (MMC) Interface, but is not limited thereto.

The card interface 7100 may interface data exchange between a host 60000 and the memory controller 2100 according to a protocol of the host 60000. According to an embodiment, the card interface 7100 may support a universal serial bus (USB) protocol, and an interchip (IC)-USB protocol. Here, the card interface 7100 may refer to hardware capable of supporting a protocol that is used by the host 60000, software installed in the hardware, or a signal transmission method.

When the memory system 70000 is connected to a host interface 6200 of the host 60000 such as a PC, a tablet, a digital camera, a digital audio player, a mobile phone, a console video game hardware, or a digital set-top box, the interface 6200 may perform data communication with the memory device 2200 through the card interface 7100 and the memory controller 2100 under control of a microprocessor 6100.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
    a memory device including first memory blocks and second memory blocks having a larger storage unit per a memory cell than the first memory blocks; and
    a memory controller configured to:
    designate a first memory block from among the first memory blocks as an open block, determine a representative attribute of the open block when a preset event occurs, and control the memory device to store data, having attributes which are different from each other, stored in the open block in a second memory block from among the second memory blocks when the representative attribute is a cold attribute,
    wherein the representative attribute of the open block is a majority attribute of the data stored in the open block among the attributes.

2. The memory system of claim 1, wherein each of the first memory blocks includes memory cells in which a storage unit is one bit, and
    wherein each of the second memory blocks includes memory cells in which a storage unit is two or more bits.

3. The memory system of claim 1, wherein the memory controller is configured to determine the representative attribute based on a count value indicating a number of times a program operation or a read operation is performed on the open block.

4. The memory system of claim 3, wherein the memory controller is configured to:
    determine the representative attribute as the cold attribute based on the count value being less than a threshold value, and
    determine the representative attribute as a hot attribute based on the count value being greater than or equal to the threshold value.

5. The memory system of claim 1, wherein the preset event comprises an event in which a flush request is received from a host.

6. A memory system comprising:
    a memory device including a first memory block, a second memory block having a larger storage unit per a memory cell than the first memory block, and a third memory block having a same storage unit as the first memory block; and
    a memory controller configured to:
    when data is received from a host, control the memory device to store the data in the first memory block,
    when an attribute of the data is cold data after a preset event occurs, control the memory device to store the data stored in the first memory block in the second memory block,
    control the memory device to store valid data stored in the first memory block in the third memory block, and
    control the memory device to erase the first memory block.

7. The memory system of claim 6, wherein the first memory block includes memory cells in which a storage unit is one bit, and
    wherein the second memory block includes memory cells in which a storage unit is two or more bits.

8. The memory system of claim 6, wherein the memory controller is configured to, when the attribute is hot data, maintain the data stored in the first memory block.

9. The memory system of claim 6, wherein the preset event comprises an event in which a flush request is received from the host.

10. The memory system of claim 6, wherein the memory controller is configured to receive the data with the attribute from the host.

11. The memory system of claim 6, wherein the memory controller is configured to:
    determine that the attribute is hot data when an access frequency of the data is greater than or equal to a reference value, and
    determine that the attribute is the cold data when the access frequency is less than the reference value.

12. A memory system comprising:
    a memory device including a first memory block, a second memory block having a smaller storage unit per a memory cell than the first memory block, and a third memory block having a same storage unit as the first memory block; and
    a memory controller configured to:
    control the memory device to store data in the first memory block, and
    when an attribute of the data is hot data after a preset event occurs, control the memory device to store the data stored in the first memory block in the second memory block, to store valid data stored in the first memory block in the third memory block, and to erase the first memory block.

13. The memory system of claim 12, wherein the first memory block includes memory cells in which a storage unit is two or more bits, and wherein the second memory block includes memory cells in which a storage unit is one bit.

14. The memory system of claim 12, wherein the memory controller is configured to, when the attribute is cold data, maintain the data stored in the first memory block.

* * * * *